(12) United States Patent
Kreacic et al.

(10) Patent No.: US 12,710,988 B2
(45) Date of Patent: Aug. 18, 2026

(54) METHOD AND SYSTEM FOR PROBABILISTIC ALLOCATION OF INDIVISIBLE RESOURCES

(71) Applicant: JPMorgan Chase Bank, N.A., New York, NY (US)

(72) Inventors: Eleonora Kreacic, London (GB); Parisa Hassanzadeh, San Jose, CA (US); Sihan Zeng, Sunnyvale, CA (US); Sumitra Ganesh, Short Hills, NJ (US); Manuela Veloso, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 407 days.

(21) Appl. No.: 18/381,274

(22) Filed: Oct. 18, 2023

(65) Prior Publication Data

US 2025/0130860 A1 Apr. 24, 2025

(51) Int. Cl.
*G06F 9/44* (2018.01)
*G06F 9/50* (2006.01)
*G06F 17/18* (2006.01)

(52) U.S. Cl.
CPC ............ *G06F 9/5033* (2013.01); *G06F 17/18* (2013.01)

(58) Field of Classification Search
CPC ................... G06F 9/5033; G06F 17/18; G06F 2209/5021; G06F 2209/504; G06F 2209/506; G06F 9/5005
USPC ........................................................ 718/104
See application file for complete search history.

(56) References Cited

U.S. PATENT DOCUMENTS

2006/0280119 A1* 12/2006 Karamanolis ......... G06F 9/5038 370/465
2011/0188507 A1* 8/2011 Watts .................... G06F 15/173 709/226
2012/0331476 A1* 12/2012 Saffre .................... G06Q 50/06 718/104
2020/0328858 A1* 10/2020 Medard ................. H04L 5/0046

* cited by examiner

*Primary Examiner* — Timothy A Mudrick
(74) *Attorney, Agent, or Firm* — Greenblum & Bernstein, P.L.C.

(57) ABSTRACT

A system and a method for allocating indivisible resources to agents over a finite horizon in a manner that balances resource utilization and fairness are provided. The method includes: receiving first information that relates to a number of agents included in a set of agents; receiving second information that relates to whether each respective agent is requesting an allocation of an indivisible resource during a particular allocation round; assigning, to each respective agent, a respective weight that relates to an importance of the respective agent; calculating, for each respective agent, a respective agent-specific allocation probability; and determining an allocation of the indivisible resource for the particular allocation round based on the agent-specific allocation probabilities. The determination of the allocation may be adjusted based on a budget that indicates an availability of the resource during the particular allocation round.

20 Claims, 4 Drawing Sheets

METHOD AND SYSTEM FOR PROBABILISTIC ALLOCATION OF INDIVISIBLE RESOURCES

BACKGROUND

1. Field of the Disclosure

This technology generally relates to methods and systems for allocating resources, and more particularly to methods and systems for allocating indivisible resources to agents over a finite horizon in a manner that balances resource utilization and fairness.

2. Background Information

The problem of multi-agent resource allocation arises in numerous disciplines, including economics, power systems, and cloud computing. This problem comes in various flavors, depending on the nature of resources, the agents' behaviors, the timing of allocation decisions, and the overall objective of the allocation process. A common element shared by various settings is the existence of one or more limited resources that need to be distributed to various agents based on their reported requests.

A resource can come in indivisible units, where a single unit of the resource must be allocated to at most one agent. For example, the resource may be in the form of an event invitation for a seat at a particular event, and as such, a single seat at an event cannot be shared by multiple agents. Further, the resource allocation may have a finite horizon, and the horizon may be understood as a number of rounds, whereby each round is characterized by allocating some amount of the resource.

There are various objectives that one might wish to optimize in the context of resource allocation. Budget minimization aims at improving the allocation efficiency and reducing the leftover inventory. Other objectives optimize efficiency along with various notions of fairness, among which Nash social welfare (NSW) is a well-known objective defined as the product of the agents' "happiness" with their allocation. In the offline setting, where an observation of all requests is made prior to making an allocation decision, NSW enjoys a few favorable properties, including being Pareto-efficient, i.e., for any other allocation there would be at least one agent who is worse off compared to the current one; envy-free, i.e., no agent prefers another agent's allocation; and proportionally fair, i.e., every agent gets their fair share of the resource; and thus exhausts the total budget.

Accordingly, there is a need for a method for allocating indivisible resources to agents over a finite horizon in a manner that balances resource utilization and fairness.

SUMMARY

The present disclosure, through one or more of its various aspects, embodiments, and/or specific features or sub-components, provides, inter alia, various systems, servers, devices, methods, media, programs, and platforms for allocating indivisible resources to agents over a finite horizon in a manner that balances resource utilization and fairness.

According to an aspect of the present disclosure, a method for allocating resources is provided. The method is implemented by at least one processor. The method includes: receiving, by the at least one processor, first information that relates to a number of agents included in a plurality of agents; receiving, by the at least one processor, second information that relates to whether, for each respective agent included in the plurality of agents, the respective agent is requesting an allocation of an indivisible resource during a particular allocation round; assigning, by the at least one processor to each respective agent included in the plurality of agents, a respective weight that relates to an importance of the respective agent; calculating, by the at least one processor for each respective agent based on the assigned respective weight, a respective agent-specific allocation probability; and determining, by the at least one processor, an allocation of the indivisible resource for the particular allocation round based on each respective agent-specific allocation probability.

The method may further include receiving third information that relates to a length of a time period and fourth information that relates to a number of allocation rounds within the time period during which the indivisible resource is to be allocated. The determining of the allocation of the indivisible resource for the particular allocation round may be further based on the third information and the fourth information.

The method may further include receiving fifth information that relates to a number of units of the indivisible resource available to be allocated during an entirety of the time period. The determining of the allocation of the indivisible resource for the particular allocation round may be further based on the fifth information.

The method may further include receiving sixth information that relates to an availability budget for the allocation of the indivisible resource during the particular allocation round. The determining of the allocation of the indivisible resource for the particular allocation round may be further based on the availability budget.

The method may further include receiving seventh information that relates to prior allocations of the indivisible resource over a predetermined period of time. The determining of the allocation of the indivisible resource for the particular allocation round may be further based on the seventh information.

The method may further include receiving eighth information that, for each respective agent that has received the allocation of the indivisible resource for the particular allocation round, indicates at least one from among the indivisible resource having been utilized by the respective agent and the indivisible resource having been wasted by the respective agent.

The method may further include measuring, based at least in part on the eighth information, a first metric that relates to at least one from among a round allocation rate, a round attendance rate, a round efficiency, an agent satisfaction rate, a weighted average for the agent satisfaction rate, an agent attendance rate, and a maximum difference of agent allocation rates.

The method may further include: obtaining a first estimate that relates to an expected future demand for the indivisible resource; and obtaining a second estimate that relates to a utilization reliability with respect to the indivisible resource. The calculating of each respective agent-specific allocation probability may include maximizing Jensen's inequality with respect to the assigned respective weight for each respective agent, the first estimate, and the second estimate.

The assigning of each respective weight to each respective agent may be based on an input that is received from a user.

According to another exemplary embodiment, a computing apparatus for allocating resources is provided. The computing apparatus includes a processor; a memory; and a communication interface coupled to each of the processor and the memory. The processor is configured to: receive, via the communication interface, first information that relates to a number of agents included in a plurality of agents; receive, via the communication interface, second information that relates to whether, for each respective agent included in the plurality of agents, the respective agent is requesting an allocation of an indivisible resource during a particular allocation round; assign, to each respective agent included in the plurality of agents, a respective weight that relates to an importance of the respective agent; calculate, for each respective agent based on the assigned respective weight, a respective agent-specific allocation probability; and determine an allocation of the indivisible resource for the particular allocation round based on each respective agent-specific allocation probability.

The processor may be further configured to receive, via the communication interface, third information that relates to a length of a time period and fourth information that relates to a number of allocation rounds within the time period during which the indivisible resource is to be allocated. The determination of the allocation of the indivisible resource for the particular allocation round may be further based on the third information and the fourth information.

The processor may be further configured to receive, via the communication interface, fifth information that relates to a number of units of the indivisible resource available to be allocated during an entirety of the time period. The determination of the allocation of the indivisible resource for the particular allocation round may be further based on the fifth information.

The processor may be further configured to receive, via the communication interface, sixth information that relates to an availability budget for the allocation of the indivisible resource during the particular allocation round. The determination of the allocation of the indivisible resource for the particular allocation round may be further based on the availability budget.

The processor may be further configured to receive, via the communication interface, seventh information that relates to prior allocations of the indivisible resource over a predetermined period of time. The determination of the allocation of the indivisible resource for the particular allocation round may be further based on the seventh information.

The processor may be further configured to receive, via the communication interface, eighth information that, for each respective agent that has received the allocation of the indivisible resource for the particular allocation round, indicates at least one from among the indivisible resource has been utilized by the respective agent and the indivisible resource has been wasted by the respective agent.

The processor may be further configured to measure, based at least in part on the eighth information, a first metric that relates to at least one from among a round allocation rate, a round attendance rate, a round efficiency, an agent satisfaction rate, a weighted average for the agent satisfaction rate, an agent attendance rate, and a maximum difference of agent allocation rates.

The processor may be further configured to: obtain a first estimate that relates to an expected future demand for the indivisible resource; obtain a second estimate that relates to a utilization reliability with respect to the indivisible resource; and perform the calculation of each respective agent-specific allocation probability by maximizing Jensen's inequality with respect to the assigned respective weight for each respective agent, the first estimate, and the second estimate.

The assignment of each respective weight to each respective agent may be based on an input that is received from a user.

According to yet another exemplary embodiment, a non-transitory computer readable storage medium storing instructions for allocating resources is provided. The storage medium includes executable code which, when executed by a processor, causes the processor to: receive first information that relates to a number of agents included in a plurality of agents; receive second information that relates to whether, for each respective agent included in the plurality of agents, the respective agent is requesting an allocation of an indivisible resource during a particular allocation round; assign, to each respective agent included in the plurality of agents, a respective weight that relates to an importance of the respective agent; calculate, for each respective agent based on the assigned respective weight, a respective agent-specific allocation probability; and determine an allocation of the indivisible resource for the particular allocation round based on each respective agent-specific allocation probability.

When executed by the processor, the executable code may further cause the processor to receive third information that relates to a length of a time period and fourth information that relates to a number of allocation rounds within the time period during which the indivisible resource is to be allocated. The determination of the allocation of the indivisible resource for the particular allocation round may be further based on the third information and the fourth information.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
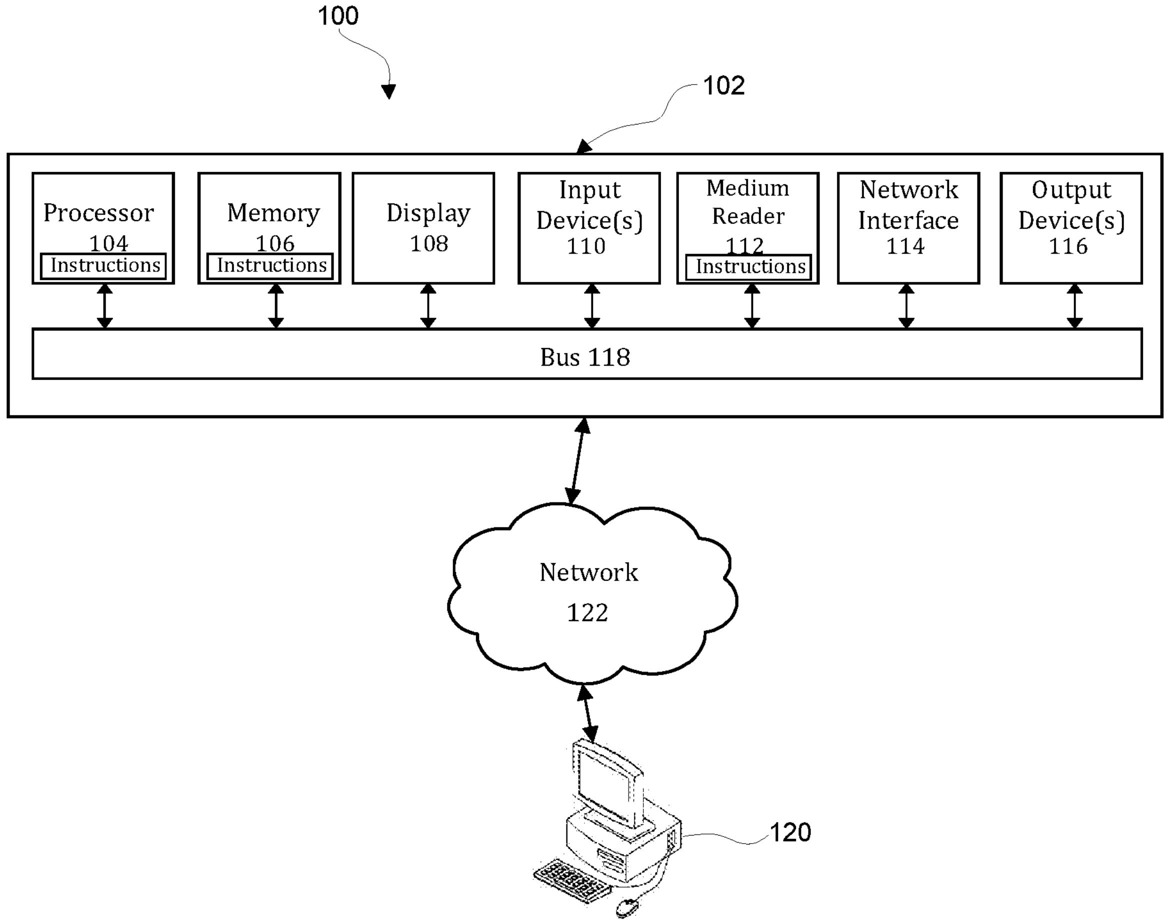
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for allocating indivisible resources to agents over a finite horizon in a manner that balances resource utilization and fairness.

Figure 2:
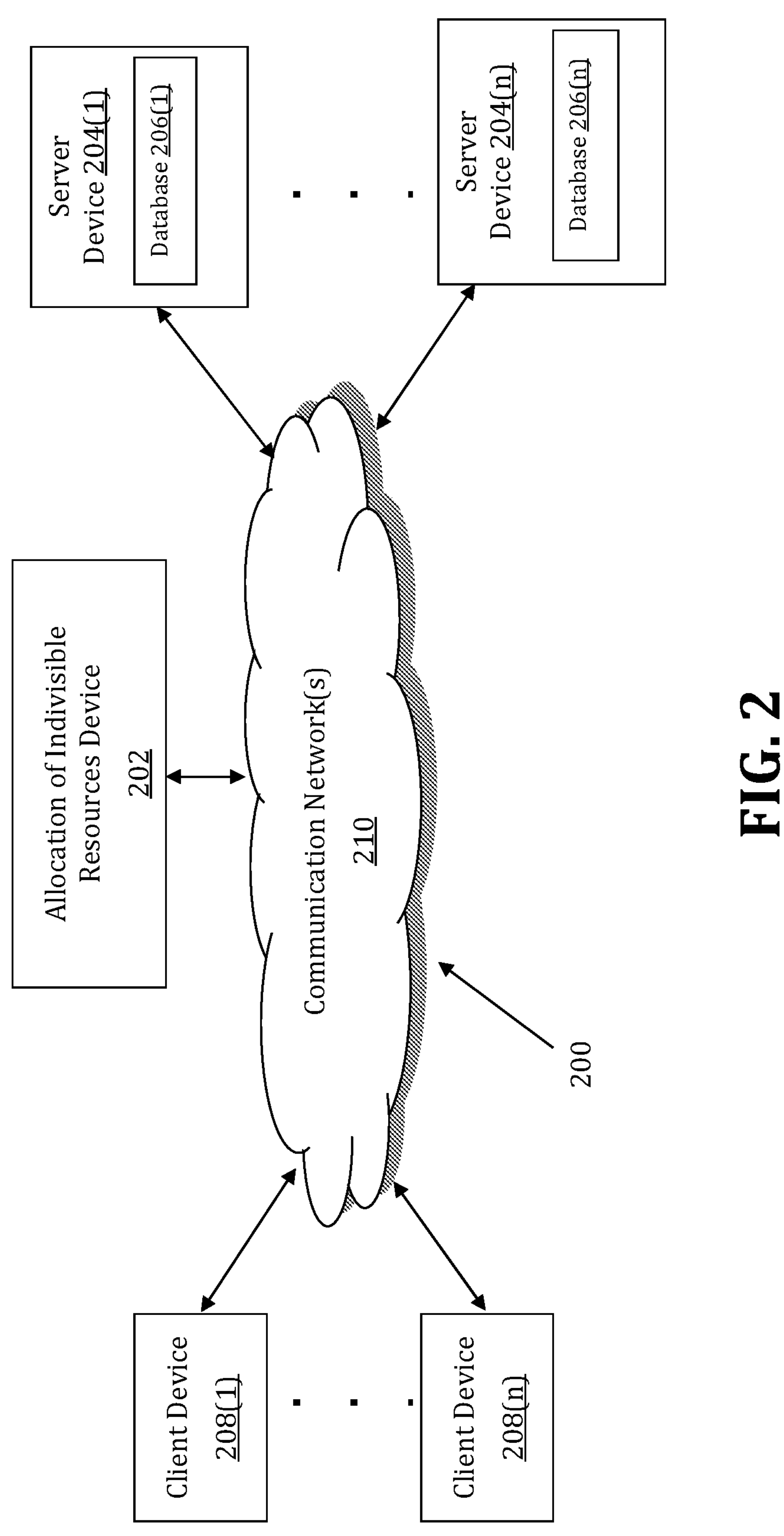
FIG. 2 illustrates an exemplary diagram of a network environment.

Referring to FIG. 2, a schematic of an exemplary network environment 200 for implementing a method for allocating limited resources to agents that reveal their stochastic demands on arrival over a finite horizon in a proportionally fair manner that exhausts available resource budget allocating indivisible resources to agents over a finite horizon in a manner that balances resource utilization and fairness is illustrated. In an exemplary embodiment, the method is executable on any networked computer platform, such as, for example, a personal computer (PC).

The method for allocating indivisible resources to agents over a finite horizon in a manner that balances resource utilization and fairness may be implemented by an Allocation of Indivisible Resources (AIR) device 202. The AIR device 202 may be the same or similar to the computer system 102 as described with respect to FIG. 1. The AIR device 202 may store one or more applications that can include executable instructions that, when executed by the AIR device 202, cause the AIR device 202 to perform actions, such as to transmit, receive, or otherwise process network messages, for example, and to perform other actions described and illustrated below with reference to the figures. The application(s) may be implemented as modules or components of other applications. Further, the application (s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the AIR device 202 itself, may be located in virtual server(s) running in a cloud-based computing environment rather than being tied to one or more specific physical network computing devices. Also, the application(s) may be running in one or more virtual machines (VMs) executing on the AIR device 202. Additionally, in one or more embodiments of this technology, virtual machine(s) running on the AIR device 202 may be managed or supervised by a hypervisor.

In the network environment 200 of FIG. 2, the AIR device 202 is coupled to a plurality of server devices 204(1)-**204(*n*) that hosts a plurality of databases 206(1)-206(*n*), and also to a plurality of client devices 208(1)-208(*n*) via communication network(s) 210. A communication interface of the AIR device 202, such as the network interface 114 of the computer system 102 of FIG. 1, operatively couples and communicates between the AIR device 202, the server devices 204(1)-204(*n*), and/or the client devices 208(1)-208(*n*), which are all coupled together by the communication network(s) 210**, although other types and/or numbers of communication networks or systems with other types and/or numbers of connections and/or configurations to other devices and/or elements may also be used.

The communication network(s) 210 may be the same or similar to the network 122 as described with respect to FIG. 1, although the AIR device 202, the server devices 204(1)-**204(*n*), and/or the client devices 208(1)-208(*n*) may be coupled together via other topologies. Additionally, the network environment 200** may include other network devices such as one or more routers and/or switches, for example, which are well known in the art and thus will not be described herein. This technology provides a number of advantages including methods, non-transitory computer readable media, and AIR devices that efficiently implement a method for allocating indivisible resources to agents over a finite horizon in a manner that balances resource utilization and fairness.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The AIR device 202 may be a standalone device or integrated with one or more other devices or apparatuses, such as one or more of the server devices 204(1)-204(*n*), for example. In one particular example, the AIR device 202 may include or be hosted by one of the server devices 204(1)-204(*n*), and other arrangements are also possible. Moreover, one or more of the devices of the AIR device 202 may be in a same or a different communication network including one or more public, private, or cloud networks, for example.

The plurality of server devices 204(1)-204(*n*) may be the same or similar to the computer system 102 or the computer device 120 as described with respect to FIG. 1, including any features or combination of features described with respect thereto. For example, any of the server devices 204(1)-204(*n*) may include, among other features, one or more processors, a memory, and a communication interface, which are coupled together by a bus or other communication link, although other numbers and/or types of network devices may be used. The server devices 204(1)-204(*n*) in this example may process requests received from the AIR device 202 via the communication network(s) 210 according to the HTTP-based and/or JavaScript Object Notation (JSON) protocol, for example, although other protocols may also be used.

The server devices 204(1)-204(*n*) may be hardware or software or may represent a system with multiple servers in a pool, which may include internal or external networks. The server devices 204(1)-204(*n*) hosts the databases 206(1)-206(*n*) that are configured to store information that relates to resource availability and information that relates to metrics for resource allocation fairness.

Although the server devices 204(1)-204(*n*) are illustrated as single devices, one or more actions of each of the server devices 204(1)-204(*n*) may be distributed across one or more distinct network computing devices that together comprise one or more of the server devices 204(1)-204(*n*). Moreover, the server devices 204(1)-204(*n*) are not limited to a particular configuration. Thus, the server devices 204(1)-204(*n*) may contain a plurality of network computing devices that operate using a master/slave approach, whereby one of the network computing devices of the server devices 204(1)-204(*n*) operates to manage and/or otherwise coordinate operations of the other network computing devices.

The server devices 204(1)-204(*n*) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(*n*) may also be the same or similar to the computer system 102 or the computer device 120 as described with respect to FIG. 1, including any features or combination of features described with respect thereto. For example, the client devices 208(1)-208(*n*) in this example may include any type of computing device that can interact with the AIR device 202 via communication network(s) 210. Accordingly, the client devices 208(1)-208(*n*) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(*n*) may run interface applications, such as standard web browsers or standalone client applications, which may provide an interface to communicate with the AIR device 202 via the communication network(s) 210 in order to communicate user requests and information. The client devices 208(1)-208(*n*) may further include, among other features, a display device, such as a display screen or touchscreen, and/or an input device, such as a keyboard, for example.

Although the exemplary network environment 200 with the AIR device 202, the server devices 204(1)-204(*n*), the client devices 208(1)-208(*n*), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the AIR device 202, the server devices 204(1)-204(*n*), or the client devices 208(1)-208(*n*), for example, may be configured to operate as virtual instances on the same physical machine. In other words, one or more of the AIR device 202, the server devices 204(1)-204(*n*), or the client devices 208(1)-208(*n*) may operate on the same physical device rather than as separate devices communicating through communication network(s) 210. Additionally, there may be more or fewer AIR devices 202, server devices 204(1)-204(*n*), or client devices 208(1)-208(*n*) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
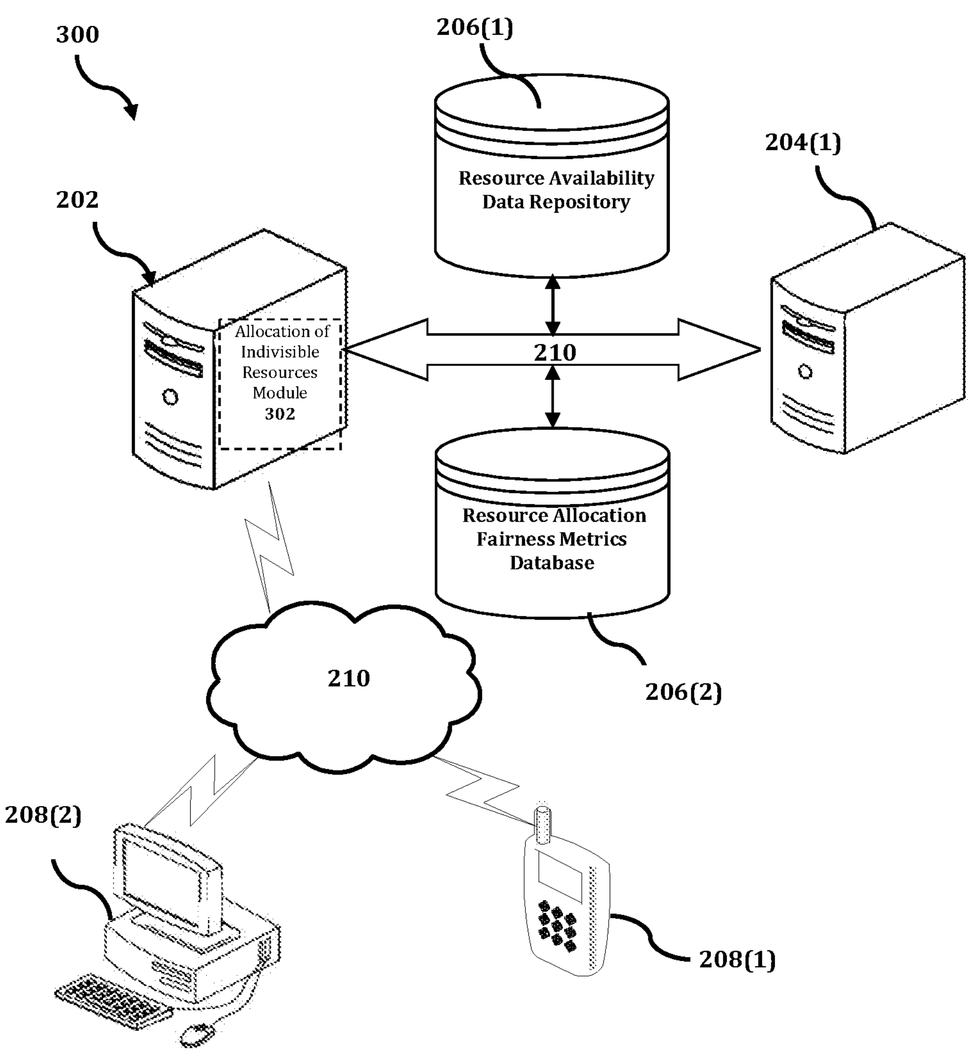
FIG. 3 shows an exemplary system for implementing a method for allocating indivisible resources to agents over a finite horizon in a manner that balances resource utilization and fairness.

The AIR device 202 is described and illustrated in FIG. 3 as including an allocation of indivisible resources module 302, although it may include other rules, policies, modules, databases, or applications, for example. As will be described below, the allocation of indivisible resources module 302 is configured to implement a method for allocating indivisible resources to agents over a finite horizon in a manner that balances resource utilization and fairness.

An exemplary process 300 for implementing a mechanism for allocating indivisible resources to agents over a finite horizon in a manner that balances resource utilization and fairness by utilizing the network environment of FIG. 2 is illustrated as being executed in FIG. 3. Specifically, a first client device 208(1) and a second client device 208(2) are illustrated as being in communication with AIR device 202. In this regard, the first client device 208(1) and the second client device 208(2) may be "clients" of the AIR device 202 and are described herein as such. Nevertheless, it is to be known and understood that the first client device 208(1) and/or the second client device 208(2) need not necessarily be "clients" of the AIR device 202, or any entity described in association therewith herein. Any additional or alternative relationship may exist between either or both of the first client device 208(1) and the second client device 208(2) and the AIR device 202, or no relationship may exist.

Further, AIR device 202 is illustrated as being able to access a resource availability data repository 206(1) and a resource allocation fairness metrics database 206(2). The allocation of indivisible resources module 302 may be configured to access these databases for implementing a method for allocating indivisible resources to agents over a finite horizon in a manner that balances resource utilization and fairness.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the AIR device 202 via broadband or cellular communication. Of course, these embodiments are merely exemplary and are not limiting or exhaustive.

Upon being started, the allocation of indivisible resources module 302 executes a process for allocating indivisible resources to agents over a finite horizon in a manner that balances resource utilization and fairness. An exemplary process for allocating indivisible resources to agents over a finite horizon in a manner that balances resource utilization and fairness is generally indicated at flowchart 400 in FIG. 4.

Figure 4:
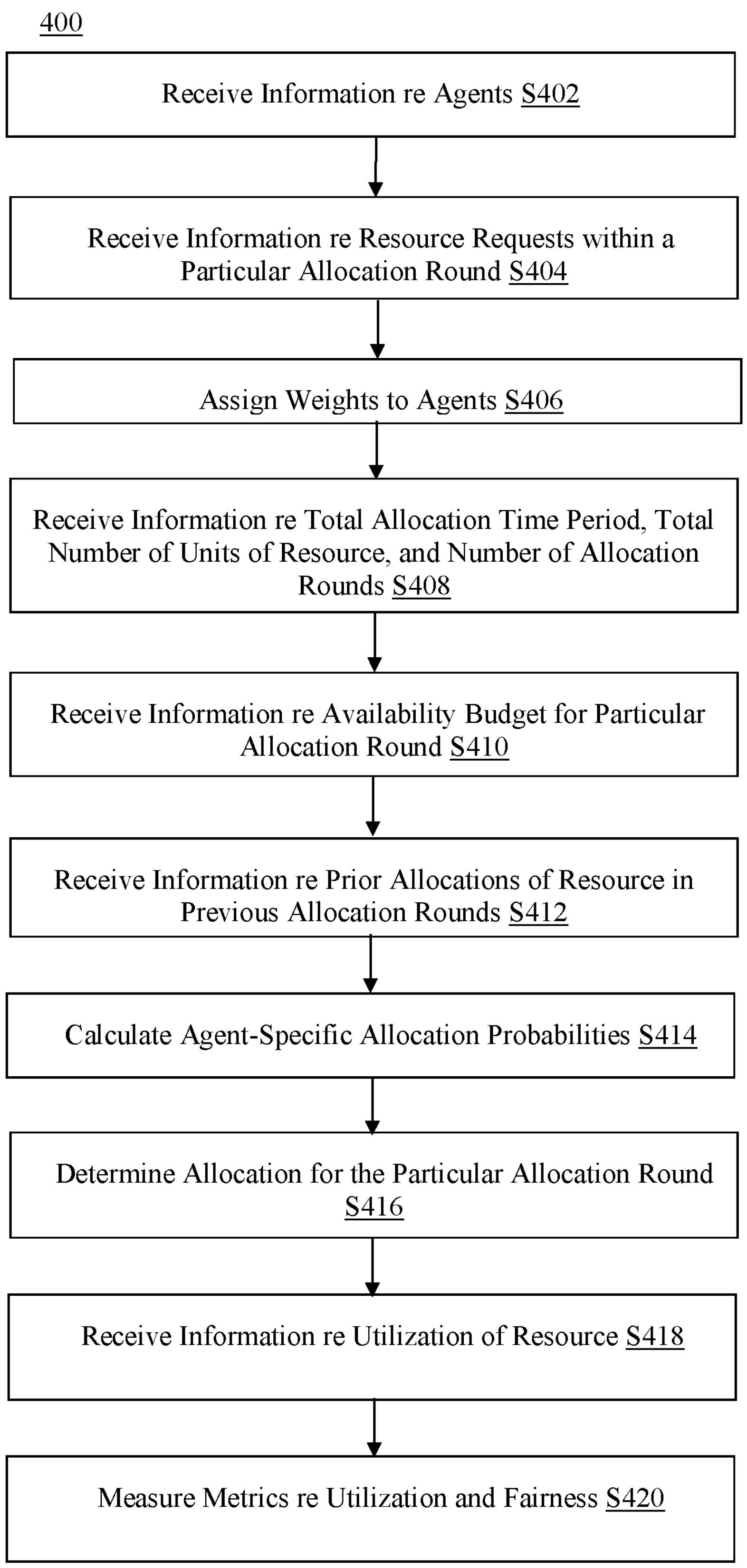
FIG. 4 is a flowchart of an exemplary process for implementing a method for allocating indivisible resources to agents over a finite horizon in a manner that balances resource utilization and fairness.

In process 400 of FIG. 4, at step S402, the allocation of indivisible resources module 302 receives first information that relates to a group of agents that are candidates for requesting and receiving access to an indivisible resource, such as, for example, an invitation to attend an event or a ticket for a seat at an event. In an exemplary embodiment, the first information includes a total number of agents that are included in the group of agents. The first information may also include identification information by which individual agents may be identified and/or other agent-specific information.

At step S404, the allocation of indivisible resources module 302 receives second information that relates to whether, for each respective agent included in the group of agents, that respective agent is requesting an allocation of the indivisible resource during a particular allocation round. In an exemplary embodiment, the indivisible resource is to be allocated during allocation rounds that shall occur over a time period that has a predetermined length, i.e., a time horizon, and the number of allocation rounds is a predetermined finite number. Further, in any particular allocation round, the number of agents that are requesting an allocation of the resource may be equal to any number between zero and the maximum, i.e., the total number of agents included in the group.

At step S406, the allocation of indivisible resources module 302 assigns weights to each agent included in the group. In an exemplary embodiment, the weights correspond to a relative importance of each respective agent, and thus, if it is deemed especially important to honor an allocation request that is submitted by one particular agent, then the weight assigned to that one particular agent may be greater than weights assigned to other agents; and if it is deemed relatively unimportant to honor an allocation request that is submitted by a different particular agent, then the weight assigned to that different particular agent may be lesser than weights assigned to at least some other agents. In an exemplary embodiment, the assignment of the weights may be based on an input that is provided by a user, such as, for example, a person that is responsible for efficiently allocating the resources in a fair and equitable way.

At step S408, the allocation of indivisible resources module 302 receives third information that relates to the overall length of the time horizon, fourth information that relates to the total number of allocation rounds that are expected to occur within the time horizon, and fifth information that relates to a total number of units of the indivisible resource that are expected to be made available for allocation.

At step S410, the allocation of indivisible resources module 302 receives sixth information that relates to an availability budget for the allocation of the indivisible resource during a particular allocation round. Then, at step S412, the allocation of indivisible resources module 302 receives seventh information that relates to prior allocations of the indivisible resource that have already occurred in previous allocation rounds.

At step S414, the allocation of indivisible resources module 302 uses the received information to calculate agent-specific allocation probabilities. In an exemplary embodiment, in addition to using the received information for the calculation, the allocation of indivisible resources module 302 may obtain a first estimate that relates to an expected future demand for the indivisible resource and a second estimate that relates to a utilization reliability with respect to the indivisible resource, and these estimates may also be factored into the calculation of each agent-specific probability. For example, the calculation may be performed by maximizing Jensen's inequality with respect to the assigned weights, the first estimate, and the second estimate. Further discussion of how Jensen's inequality may be employed is discussed below.

In an exemplary embodiment, the calculation of each agent-specific allocation probability effectively takes all of the received information into account in order to determine a likelihood that an allocation of the indivisible resource is to be made to a particular agent during a particular allocation round, in a manner that balances utilization of the resource with fairness to the agents and also a preference to satisfy agent expectations. Then, at step S416, the allocation of indivisible resources module 302 determines an allocation of the indivisible resource for the particular allocation round based on the probabilities calculated in step S414.

At step S418, after the particular allocation round is complete and all allocations for that particular round have been made, the allocation of indivisible resources module 302 receives eighth information that relate to post-allocation utilization of the indivisible resource with respect to the particular allocation round, i.e., information that relates to whether each respective agent that received the allocation during the particular allocation round actually utilized the resource or wasted the resource. Then, at step S420, the allocation of indivisible resources module 302 measures one or more metrics based at least on in part on the information regarding utilization and/or waste of the resource. In an exemplary embodiment, the metric(s) may include any one or more of a round allocation rate, a round attendance rate, a round efficiency, an agent satisfaction rate, a weighted average for the agent satisfaction rate, an agent attendance rate, and a maximum difference of agent allocation rates.

Problem formulation: In an exemplary embodiment, consideration is given to the problem of allocating indivisible resources to agents throughout a horizon of rounds. An indivisible resource is such that a unit of the resource cannot be shared by multiple agents. For example, an event invitation may be understood as being an indivisible resource, because a single seat at the event cannot be shared by multiple agents. An objective of the present disclosure is to formulate a resource allocation mechanism that balances between the resource utilization and fairness of allocations over the horizon of T rounds. The solution described herein provides a flexible framework that enables tuning between the two objectives, resource utilization (also referred to herein as "allocation efficiency") and fairness over the horizon.

More precisely, the problem is characterized by the following: 1) Consideration is given to a universe of N agents, $i \in \{1, \ldots, N\}$ over the horizon of T rounds, $t \in \{1, \ldots, T\}$. 2) Each agent i is assigned a weight $w_i \in [0,1]$ that represents the agent's importance to the decision-maker. In an exemplary embodiment, the weights are known at the beginning of the horizon and remain constant throughout the horizon. 3) Each round is characterized by a budget $B^t$ which represents the number of (indivisible) units of the resource available for allocation at round t (e.g., the number of seats available for the event organized at time t). The resource is perishable in the sense that any budget that is not allocated and/or utilized in round t cannot be carried over to future rounds. Similarly, it is not possible to transfer future budget to current rounds in order to satisfy the current demand.

4) The allocation progresses sequentially. More precisely, at a given round t, it is possible to observe the whole history of allocations of the resource, including previous demands, allocations and utilizations, prior to t, i.e. corresponding to rounds $\{1, \ldots, t-1\}$, and it is not possible to observe future demands, i.e., demands corresponding to rounds $\{t+1, \ldots, T\}$. Each round t is characterized by the observable demand, the decision on allocation, and the observation of allocation utilization, as further explained below.

5) At each round t, each agent i explicitly reports their demand in the form of discrete binary variable $$X_i^t \in \{0, 1\},$$

where $$X_i^t = 1$$

denotes agent's need for the resource in round t, while the $$X_i^t = 0$$

means that the agent is not interested in obtaining the resource in round t. All agents report their demands simultaneously. 6) Once demands $$X_i^t,\ i \in \{1, \ldots, N\}$$

are collected, the allocator decides on (binary) allocations $$A_i^t \in \{0, 1\},$$

so that the budget constraint is satisfied i.e.

$$\sum_{i=1}^{N} A_i^t \le B^t.$$

7) Agents who receive an allocation of the resource at round t, i.e., $$A_i^t = 1,$$

can subsequently decide whether they want to utilize the resource or not. The utilization $$Y_i^t \in \{0, 1\}$$

is a binary variable and is observable only after the allocation. If an agent decides not to utilize the resource allocated to them, it is not possible to re-allocate the resource to someone else in the current round, and it is also not possible to carry it over for the following rounds, i.e., the resource is wasted. If an agent does not receive the allocation at round t, then they are not able to utilize, i.e.

$$A_i^t = 0$$

then necessarily $$Y_i^t = 0.$$

8) At time of allocation in round t, future demands $$X_i^{t+1}, \ldots, X_i^T,$$

$i \in \{1, \ldots, N\}$ are not observable, and utilizations $$Y_i^t, Y_i^{t+1}, \ldots, Y_i^T, i \in \{1, \ldots, N\}$$

are also not observable. Thus, it is assume that it is possible to obtain estimates of expected demands $$\mu_i^{t+1}, \ldots, \mu_i^T \in [0, 1], i \in \{1, \ldots, N\},$$

and estimates of utilization reliability $$p_i^t, p_i^{t+1}, \ldots p_i^T \in [0, 1], i \in \{1, \ldots, N\}$$

are available.

Objective: In an exemplary embodiment, consideration is given to an allocator who aims to allocate the resource so that they achieve some form of compromise between efficiency, i.e., maximizing the resource utilization, and the worse-off client satisfaction, and further, that the allocator is able to flexibly tune between the two goals. For α>0, α≠1, attention is provided to the objective given by $$\max_{\{A_i^t\}} E\left[\sum_{i=1}^{N} \frac{w_i}{1-\alpha}\left(\sum_{t=1}^{T} A_i^t * p_i^t * \mu_i^t\right)^{1-\alpha}\right]$$

subject to the set of constraints $$\sum_{i=1}^{N} A_i^t \leq B^t \text{ for } t \in \{1, \ldots, T\}.$$

For a given agent $$i, \sum_{t=1}^{T} A_i^T * p_i^t * \mu_i^t$$

represents long-term resource utilization that is achieved by the agent i. This expression may be understood as being equivalent to the long-term utility of agent i, and so the problem translates to a welfare optimization of the well-known α-utility. Sliding parameter α in the interval [0,1) enables tuning between utilitarian (α=0) and egalitarianism (α→1) welfare objectives. More precisely, for α=0, the objective becomes $$\max_{\{A_i^t\}} E\left[\sum_{i=1}^{N} w_i\left(\sum_{t=1}^{T} A_i^t * p_i^t * \mu_i^t\right)\right]$$

which is purely utilitarian, as it is best to allocate to agents with large $$p_i^t * \mu_i^t, \text{ i.e.,}$$

predicted demand and utilization, even if this always results in allocating to the same set of agents. As α→1, the objective collapses to $$\max_{\{A_i^t\}} E\left[\sum_{i=1}^{N} w_i \log\left(\sum_{t=1}^{T} A_i^t * p_i^t * \mu_i^t\right)\right]$$

i.e., similar to long-term based Nash social welfare. Note that the expression relies on expectation, as future demands and future attendances are not observable. Such expectations may be available or otherwise estimated from past data/domain knowledge.

Downstream Metrics: Table 1 below provides a number of exemplary downstream metrics that are useful for evaluating the quality of allocation algorithms. These metrics are broadly split into two categories, i.e., round-level metrics and agent-level metrics. For each round, the allocation rate $$\eta_{alloc}^t$$

represents a fraction of satisfied agents in the cohort of agents who expressed demand at round t. Similarly, round attendance rate $$\eta_{atten}^t$$

is the fraction of allocations that got utilized at t. Finally, the average round attendance rate is the average of $$\eta_{atten}^t \text{ on } t = 1, \ldots, T.$$

For each agent i, the agent satisfaction rate $$\alpha_{satisfy}^i$$

is the fraction of the number of rounds where they had requested (i.e., demanded) and then actually received an allocation.

The overall agent satisfaction is represented by the weighted average $$\alpha_{satisfy}^i$$

over all agents. Agent attendance rate represents the fraction of the rounds where the agent utilized the resource in the total number of rounds where they had a demand/request for an allocation of the resource. Finally, consideration is given to a discrepancy between $$\alpha_{satisfy}^i$$

of the best served and the worst served agent.

TABLE 1

| Metrics | | |
|---|---|---|
| Round-Level Metrics | Round Allocation Rate | $\eta^t_{alloc} = \frac{\sum_{i=1}^N A_i^t}{\sum_{i=1}^N X_i^t}$ for $t = 1, \ldots, T$ |
| Round-Level Metrics | Round Attendance Rate | $\eta^t_{atten} = \frac{\sum_{i=1}^N Y_i^t * A_i^t}{\sum_{i=1}^N X_i^t}$ for $t = 1, \ldots, T$ |
| Round-Level Metrics | Average Round Attendance Rate (Efficiency) | $\eta = \sum_{t=1}^T \frac{\eta^t_{atten}}{T} = \sum_{t=1}^T \frac{1}{T}\left(\frac{\sum_{i=1}^N Y_i^t * A_i^t}{\sum_{i=1}^N X_i^t}\right)$ |
| Agent-Level Metrics | Agent Satisfaction Rate | $\alpha^i_{satsfy} = \frac{\sum_{t=1}^T A_i^t}{\sum_{t=1}^T X_i^t}$ |
| Agent-Level Metrics | Agent Satisfaction - Weighted Average | $\sum_{i=1}^N w_i * \alpha^i_{satisfy}$ |
| Agent-Level Metrics | Agent Attendance Rate | $\alpha^i_{atten} = \frac{\sum_{t=1}^T Y_i^t * A_i^t}{\sum_{t=1}^T X_i^t}$ |
| Agent-Level Metrics | Maximum Difference of Agent Allocation Rates | $\Delta\alpha = \left(\max_i \alpha^i_{satisfy} - \min_i \alpha^i_{satisfy}\right)$ |

Solution—Probabilistic Allocation: In an exemplary embodiment, a proposed solution is based on a stochastic allocation policy referred to as the "probabilistic allocation policy", which is determined according to the following expression:

$$A_i^t = \begin{cases} 1 & \text{with } prob\ q_i \\ 0 & \text{with } prob\ 1 - q_i \end{cases}$$

More precisely, to each agent i who has a demand or request for the resource at round t, an allocation is based on an agent-specific allocation probability $q_i$. That is, with probability $q_i$ the agent is assigned a resource, i.e., $$A_i^t = 1,$$

and with probability $1-q_i$ the agent does not receive an allocation of the resource, i.e., $$A_i^t = 0.$$

If the agent does not have a demand or request for resource, i.e., $$\text{if } X_i^t = 0$$

then the agent is not allocated a resource, i.e., $$A_i^t = 0.$$

It is noted that for the probabilistic allocation policy the objective function becomes $$E\left[\sum_{i=1}^N \frac{w_i}{1-\alpha}\left(\sum_{t=1}^T A_i^t * p_i^t * \mu_i^t\right)^{1-\alpha}\right] = \sum_{i=1}^N \frac{w_i}{1-\alpha} E\left[\left(\sum_{t=1}^T A_i^t * p_i^t * \mu_i^t\right)^{1-\alpha}\right]$$
$$\leq \sum_{i=1}^N \frac{w_i}{1-\alpha}\left(\sum_{t=1}^T E(A_i^t) * p_i^t * \mu_i^t\right)^{1-\alpha}$$
$$= \sum_{i=1}^N \frac{w_i}{1-\alpha}\left(q_i \sum_{t=1}^T p_i^t * \mu_i^t\right)^{1-\alpha}$$

where the inequality holds by Jensen's inequality for $0 \leq \alpha < 1$. Thus, there is a determination of values of $q_i$ that maximize $$\max_{q_i} \sum_{i=1}^N \frac{w_i}{1-\alpha}\left(q_i \sum_{t=1}^T p_i^t * \mu_i^t\right)^{1-\alpha}$$

such that the budget constraints in expectation are satisfied, i.e., $$\text{s.t. } \sum_{i=1}^N q_i \leq B^t \quad t = 1, \ldots T$$

It is noted that allocating according to probabilistic policy may result in an over-allocation and/or an under-allocation of the resource. In that case, the solution proceeds as follows: 1) If $$\sum_{i=1}^N A_i^t > B^t,$$

rank the clients by the coefficient $w_i * p_i$ and select the top $B^t$; and 2) if $$\sum_{i=1}^N A_i^t < B^t,$$

select remaining clients with highest $w_i * p_i$.

Thus, in an exemplary embodiment, the proposed algorithm may be summarized as follows: 1) For agents i=1, . . . , N, determine values of $q_i$ that solve the expression (*) above. 2) For each event t=1, . . . , T:

2a) For client i with $$X_i^t = 1,$$

sample allocation $$A_i^t = \begin{cases} 1 & \text{with } prob\ q_i \\ 0 & \text{with } prob\ 1 - q_i \end{cases}$$

2b) If $$\sum_{i=1}^{N} A_i^t > B^t,$$

rank the clients by the coefficient $w_i*p_i$ and select the top $B^t$.

2c) If $$\sum_{i=1}^{N} A_i^t < B^t,$$

select remaining clients with highest $w_i*p_i$.

In summary: Consideration is given to the problem of allocation of an indivisible resource in a sequential setting. The problem of unknown future demands and utilizations is addressed by estimating based on domain knowledge/historical data. The framework is flexible. The optimization objective allows for tuning between efficiency in resource exhaustion, and egalitarianism with respect to the set of agents. The proposed solution is a simple algorithm that optimizes for the desired objective in expectation, and outputs allocation probabilities agent by agent. These probabilities are further used to determine a set of allocations at each request time.

Accordingly, with this technology, an optimized process for allocating indivisible resources to agents over a finite horizon in a manner that balances resource utilization and fairness is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for allocating resources, the method being implemented by at least one processor, the method comprising:

receiving, by the at least one processor, first information that relates to a number of agents included in a plurality of agents;

receiving, by the at least one processor, second information that relates to whether, for each respective agent included in the plurality of agents, the respective agent is requesting an allocation of an indivisible resource during a particular allocation round, wherein the indivisible resource is perishable and cannot be carried over to future rounds;

assigning, by the at least one processor to each respective agent included in the plurality of agents, a respective weight that relates to an importance of the respective agent, wherein differing weights are applied to the plurality of agents;

calculating, by the at least one processor for each respective agent based on the assigned respective weight, a respective agent-specific allocation probability;

determining, by the at least one processor, an allocation of the indivisible resource for the particular allocation round based on each respective agent-specific allocation probability;

measuring metrics regarding utilization rate of the indivisible resource allocated; and modifying the respective agent-specific allocation probability based on measured utilization rate for optimizing efficiency in resource exhaustion while maintaining fairness with respect to the plurality of agents.

2. The method of claim 1, further comprising receiving third information that relates to a length of a time period and fourth information that relates to a number of allocation rounds within the time period during which the indivisible resource is to be allocated, wherein the determining of the allocation of the indivisible resource for the particular allocation round is further based on the third information and the fourth information.

3. The method of claim 2, further comprising receiving fifth information that relates to a number of units of the indivisible resource available to be allocated during an entirety of the time period, wherein the determining of the allocation of the indivisible resource for the particular allocation round is further based on the fifth information.

4. The method of claim 1, further comprising receiving sixth information that relates to an availability budget for the allocation of the indivisible resource during the particular allocation round, wherein the determining of the allocation of the indivisible resource for the particular allocation round is further based on the availability budget.

5. The method of claim 1, further comprising receiving seventh information that relates to prior allocations of the indivisible resource over a predetermined period of time, wherein the determining of the allocation of the indivisible resource for the particular allocation round is further based on the seventh information.

6. The method of claim 1, further comprising receiving eighth information that, for each respective agent that has received the allocation of the indivisible resource for the particular allocation round, indicates at least one from among the indivisible resource having been utilized by the respective agent and the indivisible resource having been wasted by the respective agent.

7. The method of claim 6, further comprising measuring, based at least in part on the eighth information, a first metric that relates to at least one from among a round allocation rate, a round attendance rate, a round efficiency, an agent satisfaction rate, a weighted average for the agent satisfaction rate, an agent attendance rate, and a maximum difference of agent allocation rates.

8. The method of claim 1, further comprising:

obtaining a first estimate that relates to an expected future demand for the indivisible resource; and obtaining a second estimate that relates to a utilization reliability with respect to the indivisible resource, wherein the calculating of each respective agent-specific allocation probability comprises maximizing Jensen's inequality with respect to the assigned respective weight for each respective agent, the first estimate, and the second estimate.

9. The method of claim 1, wherein the assigning of each respective weight to each respective agent is based on an input that is received from a user.

10. A computing apparatus for allocating resources, the computing apparatus comprising:

a processor;

a memory; and a communication interface coupled to each of the processor and the memory, wherein the processor is configured to:

receive, via the communication interface, first information that relates to a number of agents included in a plurality of agents;

receive, via the communication interface, second information that relates to whether, for each respective agent included in the plurality of agents, the respective agent is requesting an allocation of an indivisible resource during a particular allocation round, wherein the indivisible resource is perishable and cannot be carried over to future rounds;

assign, to each respective agent included in the plurality of agents, a respective weight that relates to an importance of the respective agent, wherein differing weights are applied to the plurality of agents;

calculate, for each respective agent based on the assigned respective weight, a respective agent-specific allocation probability;

determine an allocation of the indivisible resource for the particular allocation round based on each respective agent-specific allocation probability;

measure metrics regarding utilization rate of the indivisible resource allocated; and modify the respective agent-specific allocation probability based on measured utilization rate for optimizing efficiency in resource exhaustion while maintaining fairness with respect to the plurality of agents.

11. The computing apparatus of claim 10, wherein the processor is further configured to receive, via the communication interface, third information that relates to a length of a time period and fourth information that relates to a number of allocation rounds within the time period during which the indivisible resource is to be allocated, wherein the determination of the allocation of the indivisible resource for the particular allocation round is further based on the third information and the fourth information.

12. The computing apparatus of claim 11, wherein the processor is further configured to receive, via the communication interface, fifth information that relates to a number of units of the indivisible resource available to be allocated during an entirety of the time period, wherein the determination of the allocation of the indivisible resource for the particular allocation round is further based on the fifth information.

13. The computing apparatus of claim 10, wherein the processor is further configured to receive, via the communication interface, sixth information that relates to an availability budget for the allocation of the indivisible resource during the particular allocation round, wherein the determination of the allocation of the indivisible resource for the particular allocation round is further based on the availability budget.

14. The computing apparatus of claim 10, wherein the processor is further configured to receive, via the communication interface, seventh information that relates to prior allocations of the indivisible resource over a predetermined period of time, wherein the determination of the allocation of the indivisible resource for the particular allocation round is further based on the seventh information.

15. The computing apparatus of claim 10, wherein the processor is further configured to receive, via the communication interface, eighth information that, for each respective agent that has received the allocation of the indivisible resource for the particular allocation round, indicates at least one from among the indivisible resource has been utilized by the respective agent and the indivisible resource has been wasted by the respective agent.

16. The computing apparatus of claim 15, wherein the processor is further configured to measure, based at least in part on the eighth information, a first metric that relates to at least one from among a round allocation rate, a round attendance rate, a round efficiency, an agent satisfaction rate, a weighted average for the agent satisfaction rate, an agent attendance rate, and a maximum difference of agent allocation rates.

17. The computing apparatus of claim 10, wherein the processor is further configured to:

obtain a first estimate that relates to an expected future demand for the indivisible resource;

obtain a second estimate that relates to a utilization reliability with respect to the indivisible resource; and perform the calculation of each respective agent-specific allocation probability by maximizing Jensen's inequality with respect to the assigned respective weight for each respective agent, the first estimate, and the second estimate.

18. The computing apparatus of claim 10, wherein the assignment of each respective weight to each respective agent is based on an input that is received from a user.

19. A non-transitory computer readable storage medium storing instructions for allocating resources, the storage medium comprising executable code which, when executed by a processor, causes the processor to:

receive first information that relates to a number of agents included in a plurality of agents;

receive second information that relates to whether, for each respective agent included in the plurality of agents, the respective agent is requesting an allocation of an indivisible resource during a particular allocation round, wherein the indivisible resource is perishable and cannot be carried over to future rounds;

assign, to each respective agent included in the plurality of agents, a respective weight that relates to an importance of the respective agent, wherein differing weights are applied to the plurality of agents;

calculate, for each respective agent based on the assigned respective weight, a respective agent-specific allocation probability;

determine an allocation of the indivisible resource for the particular allocation round based on each respective agent-specific allocation probability;

measure metrics regarding utilization rate of the indivisible resource allocated; and modify the respective agent-specific allocation probability based on measured utilization rate for optimizing efficiency in resource exhaustion while maintaining fairness with respect to the plurality of agents.

20. The storage medium of claim 19, wherein when executed by the processor, the executable code further causes the processor to receive third information that relates to a length of a time period and fourth information that relates to a number of allocation rounds within the time period during which the indivisible resource is to be allocated, wherein the determination of the allocation of the indivisible resource for the particular allocation round is further based on the third information and the fourth information.

* * * * *